Nov. 3, 1936.    F. C. TOWNSEND    2,059,762
ANTIGLARE DEVICE FOR VEHICLE LAMPS
Filed Jan. 24, 1936

Inventor
Frank C. Townsend
By Mawhinney & Mawhinney
Attorneys

Patented Nov. 3, 1936

2,059,762

UNITED STATES PATENT OFFICE 2,059,762

ANTIGLARE DEVICE FOR VEHICLE LAMPS

Frank C. Townsend, Topsham, Maine

Application January 24, 1936, Serial No. 60,668

2 Claims. (Cl. 240—48.4)

The present invention relates to improvements in anti-glare devices for vehicle lamps, and has for an object to provide a device of this character which, in a construction housed wholly within the lamp casing, takes advantage of the structure and function described and shown in my prior Patent No. 1,981,761, granted November 20, 1934.

It is the object of the invention to secure this localizing of the light beam to a horizontal zone or belt and to also intensify the illumination at and in front of the vehicle whereby to give the vehicle a well defined illuminated outline to easily distinguish it by other motorists to the end that it may be given a clear berth in passing.

The restriction of the light beam to the horizontal belt or zone avoids blinding opposing motorists and promotes safety and an intensified localized beam for the purpose of illuminating the road ahead which is the primary purpose of vehicle head lamps.

In addition the present invention aims to secure the advantages of my prior patented device without in any way changing or affecting the external appearance of the head lamps which are now made to blend in with the general contour and design of present day motor cars.

It is a further object of the invention to provide a device for accomplishing the above described purposes which will repose entirely within the head lamp in an unobtrusive manner.

A still further object of the invention is to materially restrict the light rays which are now allowed to spread without utility into the fields beside the road, and to utilize this heretofore wasted illumination for intensifying the horizontal light beam permitted to pass out from the lamp.

With the foregoing and other objects in view the invention will be described more in detail hereinafter and more specifically pointed out in the appended claims:—

In the drawing, wherein like reference characters refer to like or corresponding parts throughout the several views:—

Figure 1:
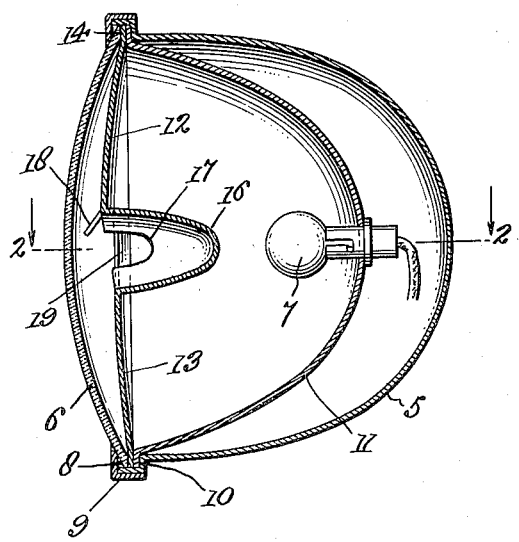
Figure 1 is a vertical sectional view through a conventional form of automobile head lamp showing the improved device in place therein.

Referring more particularly to the drawing, 5 designates a casing for a head lamp such as ordinarily employed at the present time upon automobiles; and 6 represents the glass lens carried at the front of such casing and through which the rays of light from the lamp 7, or other source of illumination, pass. The glass lens 6 is bowed outwardly, or otherwise expressed is of a concavo-convex formation, having an annular rim portion 8 seated in an annular channel 9 at the forward portion of the lamp casing 5. In this channel may also be seated the marginal forward flange 10 of the parabolic or other reflector 11.

The lens 6 of glass is usually characterized in its construction by various prismatic arrangements, but in almost every case quantities of light are diverted upwardly and resultantly into the eyes of on-coming drivers.

This condition is counteracted as far as possible at the present time by the adjustment of the lamp casing.

In accordance with the invention an opaque shield plate or disc is mounted within the casing and is generally composed of two half sections 12 and 13 joined together by a continuously circular rim 14 of a character to admit of its being received in the channel 9 between the flanges 8 and 10.

The plate is preferably stamped, or otherwise produced, from sheet metal or other material having sufficient stability and capable of receiving upon its inner surface, namely that surface presented to the lamp 7, a high polish, such as communicated to the interior surface of the reflector 11.

The upper and lower sections 12 and 13 are spaced apart to produce a substantially horizontal slot or opening 15. This slot extends substantially from side to side of the lamp casing in a horizontal, or substantially horizontal direction. The slot may be of any desired height. The half sections 12 and 13 of the shield plate, besides being joined together outwardly of the edges of said slot 15, are connected centrally by a neck or connecting web. This web or neck may be of any desired form or shape and may be stamped out with the shield plate, or formed separately therefrom and subsequently attached, but this neck 16 is preferably of a parabolic form, or of other form, substantially conforming to the geometrical figure followed by the reflector 11. The inner end portion of the neck 6 is closed but the outer portion thereof is completely open, and cut-out portions 17 are made in the side walls of the neck opening outwardly through its forward edge at the point where such edge would ordinarily lie in the horizontal slot 15.

The neck 16, however, connects at its upper and lower portions with the two sections 12 and 13 and by virtue of its parabolic or other like form, it is possessed of great strength and firmly holds the two sections 12 and 13 in their proper relative arrangement, which is a dished-out or concavo-convex form, wherein the upper section 12 is deflected outwardly to a greater degree than the lower section 13, whereby the upper section 12 will allow passage of a certain quantity of light downwardly and outwardly of the lower section 13 for the purpose of illuminating the road directly in front of the automobile.

In the slot 15 at opposite sides of the neck 16 are flanges 18. These flanges depend from the lower edge of the upper section 12 and are deflected outwardly at an acute angle to the plane of the section 12. The under surfaces of the flanges 18 are polished and act as reflectors.

Figure 2:
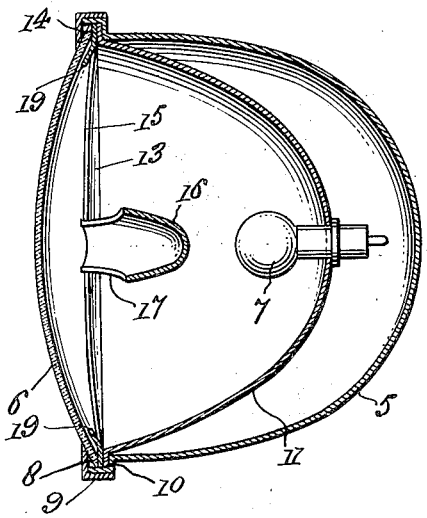
Figure 2 is a horizontal section taken on the line 2—2 in Figure 1.
Figure 3:
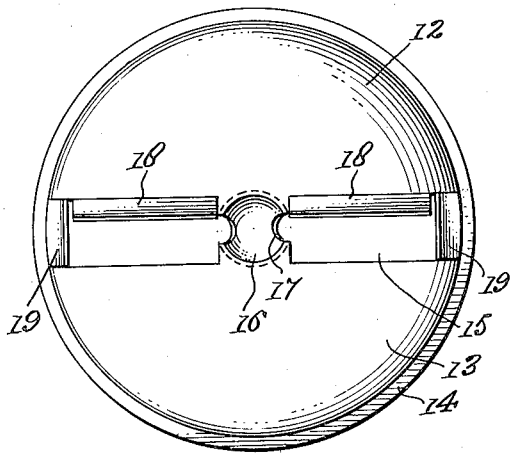
Figure 3 is a front elevation of the improved anti-glare device shown apart from the lamp.
Figure 4:
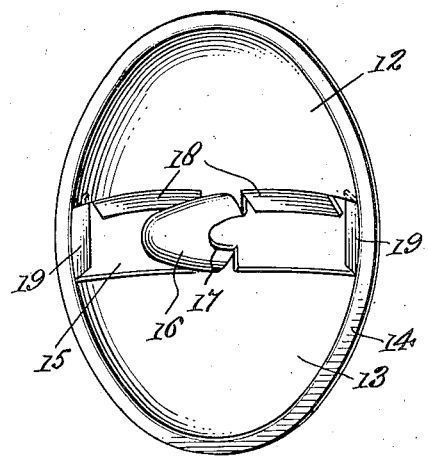
Figure 4 is a perspective view of the same taken from the side opposite that shown in Figure 3.

In addition other flanges 19 are mounted at the ends of the slot 15, being carried by the rim portion 14. These end deflectors or flanges extend outwardly at an acute angle, as indicated in Figures 2 and 4, and are polished as to their inner surfaces.

The entire outer surface of the sections 12 and 13, and of the flanges 18 and 19 is blackened or deadened to absorb light from the head lamps of on-coming vehicles and there are no surfaces which would act to reflect the light beams from a motor car back in the driver's eyes.

In the use of the device the plate member may be economically stamped from relatively inexpensive sheet material and transported and shipped in a minimum of space at low cost. Such devices admit of low retail sale and can be applied to the conventional head lamp by simply removing the lens 6, inserting the device and replacing such lens.

Light will be excluded by the upper and lower sections 12 and 13 from similar areas of the lens 6 but the inner polished surfaces of such sections 12 and 13 will cooperate with the parabolic reflector 11 to reflect the light rays back and forth until they issue in an intensified horizontal band through the opening 15. Direct rays from the lamp 7 are excluded from passing through the central portion of the slot 15 by the closed end of the neck 16.

By the parabolic form of this neck 6, the closed end approaches as close as practicable to the light source 7 on the theory that the closer such closed end is to the light source the smaller it may be in diameter and yet have the same effect to exclude the direct rays. The parabolic form of the neck 6 permits of maintaining the entire neck at only slightly greater diameter than the closed end of the neck so that the neck will interfere as little as possible with reflected light rays. Of course the inner surface of the neck 16 is polished whereby to coact with the reflector 11 and the polished surfaces of the sections 12 and 13. The cut-away portions 17 are made adjacent the slot 15 so as to permit the passage of light rays through these cut-away portions. The neck 16 is thus constructed to give a minimum of interference with the light rays and at the same time perform its two functions of excluding direct rays and firmly maintaining the two sections 12 and 13 in their relative relation.

The flanges 18 will, besides deflecting a quantity of the light rays downwardly upon the front portion of the vehicle and upon the ground immediately in front of the vehicle, also have the effect as a reflector to reflect the rays back and forth with the other polished internal surfaces.

With respect to the end flanges or deflectors 19, these deflectors will minimize the fanning of the light outwardly toward the sides of the road, and by their polished inner surface will reflect this otherwise wasted light back for reflection out through the slot 15 where it may be utilized to augment and intensify the rays emanating from the lamp.

The invention therefore has the effect to produce an intensified constricted beam of light localized to a position where it will secure the greatest effects of road illumination without scattering the light either laterally or upwardly. Besides increasing desired illuminating effects, the hazards of night driving will be greatly reduced.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a head lamp for vehicles, a reflector, source of illumination and lens, a plate having a light absorbing outer surface and a light deflecting inner surface, said plate having a continuously circular rim fitted between said reflector and lens, said plate composed of upper and lower sections spaced apart to provide a substantially horizontal slot, a neck of substantially parabolic form connecting with the upper and lower sections at a substantially central point and bridging across said slot, said parabolic neck having lateral cut-away portions, said upper section having outwardly and downwardly inclined flanges extending from its lower edge, said rim having forwardly inclined flanges at the end portions of said slot.

2. In a head lamp for vehicles, a reflector, source of illumination and lens, a plate having a continuously circular rim fitted between said reflector and lens and composed of upper and lower sections spaced apart to provide a substantially horizontal slot, a neck of substantially parabolic form connecting with the upper and lower sections at a substantially central point and bridging across said slot, said parabolic neck having lateral cut-away portions, said upper section having outwardly and downwardly inclined flanges extending from its lower edge, said rim having forwardly and inwardly inclined flanges at the end portions of said slot.

FRANK C. TOWNSEND.